(12) United States Patent
Aikawa et al.

(10) Patent No.: US 6,519,402 B2
(45) Date of Patent: Feb. 11, 2003

(54) DISPERSION COMPENSATING OPTICAL FIBER, AND DISPERSION COMPENSATING OPTICAL FIBER MODULE

(75) Inventors: Kazuhiko Aikawa, Sakura (JP); Takaaki Suzuki, Sakura (JP); Kuniharu Himeno, Sakura (JP)

(73) Assignee: Fujikura, Ltd., Tokyo (JP)

( * ) Notice: Subject to any disclaimer, the term of this patent is extended or adjusted under 35 U.S.C. 154(b) by 18 days.

(21) Appl. No.: 09/901,379

(22) Filed: Jul. 9, 2001

(65) Prior Publication Data

US 2002/0097969 A1 Jul. 25, 2002

(30) Foreign Application Priority Data

Nov. 27, 2000 (JP) ........................ 2000-359772

(51) Int. Cl.⁷ ................................ G02B 6/02
(52) U.S. Cl. .................. 385/124; 385/123; 385/126
(58) Field of Search .............. 385/123–127, 385/141–145

(56) References Cited

U.S. PATENT DOCUMENTS

| | | | |
|---|---|---|---|
| 4,715,679 A | | 12/1987 | Bhagavatula |
| 5,361,319 A | | 11/1994 | Antos et al. |
| 6,178,279 B1 | * | 1/2001 | Mukasa et al. ............. 385/123 |
| 6,324,317 B1 | * | 11/2001 | Tanaka et al. ............... 385/24 |
| 2001/0051017 A1 | * | 1/2001 | Okuno ......................... 385/24 |
| 2001/0022883 A1 | * | 2/2001 | Montmorillon et al. ..... 385/123 |
| 2002/0048439 A1 | * | 2/2001 | Tsukitani et al. ........... 385/123 |
| 2001/0051031 A1 | * | 3/2001 | Hada et al. ................. 385/123 |

OTHER PUBLICATIONS

Y. Akasaka et al. "High–dispersion–compensation ability and low nonlinearity of W–shaped DCF", OFC '96 Technical Digest, pp. 201–202, 1996.*

Yanada, E., et al., "Dual–band Hybrid Transmission Line Consisting of Pure Silica Core Fiber and Dispersion Compensating Fiber, "Optical Fiber Communication Conference 2000, Baltimore, Maryland, Technical Digest, (Mar. 7, 2000), pp 92–94.

Suzuki, T., et al., "Dispersion Compensating Fiber With Negative Dispersion Slope and Large Effective Core Area," Proceedings of the 2000 IEICE General Conference, Hiroshima University, Higashi–Hiroshima, Mar. 28–31, 2000, p 221.

Yanada, E., et al., Perfectly Dispersion Slope Compensated Hybrid Optical Transmission Line (PureCouple TM), Proceedings of the 2000 IEICE General Conference, Hiroshima University, Higashi–Hiroshima, Mar. 28–31, 2000, p. 217.

Suzuki, T., et al., "Large–effective–area dispersion compensating fibers for dispersion accommodation both in the C and L band," OECC 2000 Technical Digest, Chiba, Japan, Jul. 10–14, 2000, pp. 554–555.

Fujii, T., et al., High Performance Dispersion Compensating Fiber Modules By 'Stress–Free Coil'Packaging Technique, NFOEC Technical Proceedings, Denver, Colorado, Aug. 27–31, 2000, pp. 420–429.

* cited by examiner

Primary Examiner—Akm E. Ullah
Assistant Examiner—Sarah N. Song
(74) Attorney, Agent, or Firm—Bell, Boyd & Lloyd LLC

(57) ABSTRACT

By limiting the ranges of the numerical values of a plurality of structural parameters of a dispersion compensating optical fiber which is endowed with a segmented W-shaped refractive index profile, and by suitably combining these structural parameters, it is possible to obtain a dispersion compensating optical fiber which can compensate both for chromatic dispersion and also for dispersion slope of a single mode optical fiber for transmission over a wide wavelength band which is selected from the range from 1.53 $\mu$m to 1.63 $\mu$m, and for which the value of Aeff is large, and moreover the absolute value of chromatic dispersion is large. As a result desirable transmission characteristics are obtained by being able to suppress the occurrence of non-linearity effects, and furthermore, since the length which is required is short, the cost is low, and it is possible to produce a module which is small in size.

19 Claims, 2 Drawing Sheets

DISPERSION COMPENSATING OPTICAL FIBER, AND DISPERSION COMPENSATING OPTICAL FIBER MODULE

BACKGROUND OF THE INVENTION

1. Field of the Invention

The present invention relates to a dispersion compensating optical fiber, and to a dispersion compensating optical fiber module. This specification is based upon Japanese Patent Application 2000-359772, and hereby incorporates the contents thereof by reference.

2. Background Art

A dispersion compensating optical fiber is an optical fiber which compensates for chromatic dispersion which accumulates due to propagation through a single mode optical fiber which is incorporated in a transmission line of an optical communication system. In concrete terms, although for example chromatic dispersion occurs when a single mode optical fiber (such as one for use at 1.3 µm) which has a zero dispersion wavelength on the short wavelength side of the 1.55 µm band is used for this 1.55 µm band, it is possible to compensate for this chromatic dispersion by utilizing a dispersion compensating optical fiber. As a result, it is possible to enhance the transmission speed of the optical communication system. In the following, for the convenience of description, the single mode optical fiber which is the object of compensation by this type of dispersion compensating optical fiber will be termed by the present inventors, 'the single mode optical fiber for transmission'.

On the other hand, in optical communication systems, widening of the wavelength band and increase of the number of multiplexed wavelengths is making rapid progress in accompaniment with the requirements for increase of capacity and increase of transmission speed.

In this connection, dispersion compensating optical fibers are also being developed which can compensate for chromatic dispersion of a single mode optical fiber for transmission in a wide wavelength band. For this it is necessary, not only to compensate for chromatic dispersion, but also to compensate for the dispersion slope which specifies the tendency of chromatic dispersion with respect to wavelength.

It should be understood that the chromatic dispersion and the dispersion slope in the 1.55 µm band of a single mode optical fiber for transmission such as a single mode optical fiber for use at 1.3 µm or the like are generally both positive values. Thus, a requirement for a dispersion compensating optical fiber is to have negative values of chromatic dispersion and dispersion slope.

A dispersion compensating optical fiber which has a so-called W-shaped refractive index profile, as shown in FIG. 1, has been proposed as one which can perform compensation for both chromatic dispersion and dispersion slope, as discussed above.

This dispersion compensating optical fiber with this refractive index profile is made up from a core 1 and a cladding layer 2 which is provided at an outer periphery of the core 1. And this core 1 is made up from a central core portion which is provided in its center and an intermediate core portion 4 which is provided at an outer periphery of this central core portion 3. The central core portion 3 is endowed with a higher refractive index than that of the cladding layer 2, while the intermediate core portion 4 is endowed with a lower refractive index than the cladding layer 2.

In FIG. 1, $\Delta 1$ is the relative refractive index difference of the central core portion 3 when the refractive index difference of the cladding layer 2 is taken as a reference. And $\Delta 2$ is the relative refractive index difference of the intermediate core portion 4 when the refractive index difference of the cladding layer 2 is taken as a reference. Further, a is the radius of the central core portion 3, while b is the radius of the intermediate core portion 4.

By adjusting the values of $\Delta 1$, $\Delta 2$, and b/a for a dispersion compensating optical fiber which has this W-shaped refractive index profile, characteristics are obtained which make it possible to compensate for the chromatic dispersion and the dispersion slope of a single mode optical fiber for transmission which has positive values of chromatic dispersion and dispersion slope, in for example the 1.55 µm band.

Further, a dispersion compensating optical fiber which has a so-called segmented W-shaped refractive index profile as shown in FIG. 2 has also been developed, with the objective of increasing the effective area (hereinafter termed "Aeff"), improving the bending loss, and widening the band of dispersion slope compensation.

This dispersion compensating optical fiber with this refractive index profile is made up from a core 11 and a cladding layer 12 which is provided at an outer periphery of the core 11. And this core 11 is made up from a central core portion which is provided in its center, an intermediate core portion 14 which is provided at an outer periphery of this central core portion 13, and a ring core portion 15 which is provided at an outer periphery of this intermediate core portion 14. The central core portion 13 is endowed with a higher refractive index than that of the cladding layer 12 and the intermediate core portion 14 is endowed with a lower refractive index than the cladding layer 12, while the ring core portion 15 is endowed with a refractive index which is lower than that of the central core portion 13 but is higher than that of the cladding layer 12.

In FIG. 2, $\Delta 1$ is the relative refractive index difference of the central core portion 13 when the refractive index difference of the cladding layer 12 is taken as a reference, $\Delta 2$ is the relative refractive index difference of the intermediate core portion 14 when the refractive index difference of the cladding layer 12 is taken as a reference, and $\Delta 3$ is the relative refractive index difference of the ring core portion 15 when the refractive index difference of the cladding layer 12 is taken as a reference. Further, a is the radius of the central core portion 13, b is the radius of the intermediate core portion 14, and c is the radius of the ring core portion 15.

In this case as well, by adjusting the values of $\Delta 1$, $\Delta 2$, $\Delta 3$, b/a, and c/b for a dispersion compensating optical fiber which has this segmented W-shaped refractive index profile, characteristics are obtained which make it possible to compensate for the chromatic dispersion and the dispersion slope of a single mode optical fiber for transmission which has positive values of chromatic dispersion and dispersion slope, in for example the 1.55 µm band.

A dispersion compensating optical fiber may be, for example, incorporated into a cable which is inserted into a transmission line. Furthermore, it may be incorporated into a small sized dispersion compensating optical fiber module (sometimes hereinafter simply termed a "module"), which can be arranged at the receiving side or at the transmitting side of a transmission line which already exists. It should be understood that such a module may, for example, also incorporate a housing, within which there is stored a reel upon which the dispersion compensating optical fiber is wound. And within the housing the two ends of the dispersion compensating optical fiber are connected to single mode optical fibers for transmission which are for leading them out, and these optical fibers for leading out project to the outside of the housing through two lead out holes provided therein. Thus the dispersion compensating optical fiber module may be inserted into a transmission line by connecting a single mode optical fiber for transmission which is disposed externally to said housing to the end portions of these two optical fibers for leading out. Moreover, as a construction for this module, connection portions may also be provided upon the side surfaces of the housing for connecting the external single mode optical fiber for transmission.

By the way, it is desirable to obtain the benefit of compensation by using a comparatively short length of dispersion compensating optical fiber. In order to do this, it is desirable for the absolute value of the chromatic dispersion of the dispersion compensating optical fiber per unit length to be large.

Since a dispersion compensating optical fiber which is endowed with the above described W-shaped refractive index profile has a large absolute value of chromatic dispersion per unit length, so that AΔ1 is large, the radius of the core is set to a small value.

FIG. 3 is a graph showing the relationship between dispersion slope and chromatic dispersion for the W-shaped refractive index profile shown in FIG. 1, with the operating wavelength being 1.55 $\mu$m, when AΔ1 was fixed at 1.8%, Δ2 was fixed at −0.4%, and the values of b and b/a were changed. The wavelength for measurement was 1.55 $\mu$m.

The broken line S in the graph shows the relationship between dispersion slope and chromatic dispersion when it was possible to perform 100% compensation for both chromatic dispersion and dispersion slope of a conventional single mode optical fiber for use at 1.3 $\mu$m, and in the vicinity of this broken line S approximately ideal compensation operation was attained. Moreover, at an operating wavelength of 1.55 $\mu$m, this single mode optical fiber for use at 1.3 $\mu$m had a chromatic dispersion of +17 ps/nm/km and a dispersion slope of +0.055 ps/nm$^2$/km.

In this graph, for each value of b/a, with the ratio b/a kept constant, a set of points was assembled as the value of b was changed by steps of 0.1 $\mu$m. For each value of b/a, the range over which b was varied was as follows:
when b/a=3.0, b was varied from 4.0 $\mu$m to 3.6 $\mu$m;
when b/a=3.5, b was varied from 4.5 $\mu$m to 4.2 $\mu$m;
when b/a=4.0, b was varied from 5.0 $\mu$m to 4.7 $\mu$m;
when b/a=4.5, b was varied from 5.5 $\mu$m to 5.3 $\mu$m.

Since there was a tendency for the absolute value of the chromatic dispersion to become larger as the value of b became smaller, for each value of b/a, that value of b for which the absolute value of the chromatic dispersion was the largest was set as a lower limit value for the range of b, while that value of b for which the absolute value of the chromatic dispersion was the smallest was set as an upper limit value for the range of b.

Further, the numerical values in the graph are the values of Aeff. With an optical communication system, the transmission state is deteriorated when nonlinearity effects occur during the transmission of the optical signal, and it is known that this becomes an obstacle to long distance transmission and high speed transmission and the like. Nonlinearity effects can easily occur when the power of the optical signal is high. And in wavelength multiplex transmission the power of the optical signal is high, not only when amplifying the optical signal at relay points, but also from the start of input, and nonlinearity effects can easily occur.

And it is known that it is desirable for Aeff to be as large as possible, in order to inhibit nonlinearity effects.

Since as shown in the graph the value of Aeff for a dispersion compensating optical fiber which is endowed with a W-shaped refractive index profile is small, there has been insufficient inhibition of nonlinearity effects. Moreover, in the Proceeding of the 2000 Institute of Electronics, Information and Communication Engineers (IEICE) General Conference*1 etc., a dispersion compensating optical fiber which is endowed with a W-shaped refractive index profile is reported for which Aeff is 18.4 $\mu$m$^2$. However, no dispersion compensating optical fiber has ever been reported for which Aeff is yet greater.

*1: "Perfectly dispersion slope compensated hybrid optical transmission line (PureCouple™)" C-3-38, P217, Proceeding of The 2000 Institute of Electronics, Information and Communication Engineers (IEICE) General Conference, published on Mar. 28, 2000.

Further, with the segmented W-shaped refractive index profile shown in FIG. 2, according to past investigations by the present inventors, an optical compensating fiber with a value of Aeff of 21 $\mu$m$^2$ has been obtained, according to design conditions. However, the absolute value of chromatic dispersion for this dispersion compensating optical fiber has been the low value of 61.5 ps/nm/km, and the problem arises that the length which is required for compensating the chromatic dispersion of a single mode optical fiber for transmission is long. As a result the problem arises that the cost becomes high, since it often happens that the cost of the dispersion compensating optical fiber is high as compared with the cost of the single mode optical fiber for transmission.

Furthermore, the following types of problem particularly arise when manufacturing a module when the length which is used is long. Namely, when the dispersion compensating optical fiber is made into a module, it is necessary to be able to wind up the fiber upon a reel which is comprised in the module, and moreover to store the fiber in its state as wound up on the reel within the housing. Accordingly, when the length which is used is long, inevitably the reel and the housing become of considerable size, and along with the cost becoming high, the problem has arisen that the space required becomes great.

Yet further, although in this manner it is desirable from the points of view of space and of cost that the module should be designed to be as compact as possible, when the bending loss of the dispersion compensating optical fiber is high, the transmission loss becomes high when the fiber is wound up upon a small sized reel. However with a prior art type dispersion compensating optical fiber it has been considered as being extremely difficult, over a wide wavelength band, to satisfy the conditions that, along with being able to compensate the chromatic dispersion and the dispersion slope, Aeff should be large, the absolute value of the chromatic dispersion should be large, and moreover the bending loss should be low.

SUMMARY OF THE INVENTION

A primary object of the present invention is to provide a dispersion compensating optical fiber which is capable of compensating both the chromatic dispersion and the dispersion slope of a single mode optical fiber for transmission over as wide a wavelength band as possible, and for which Aeff is large and the absolute value of chromatic dispersion is large.

And another object of the present invention is to provide a dispersion compensating optical fiber which is able to suppress the occurrence of nonlinearity effects, so that the transmission loss is low.

A further object of the present invention is to provide a dispersion compensating optical fiber with which the length required (operating length) is short, so that the cost is reduced, and moreover so that it is possible to produce a small sized module which incorporates said compensating optical fiber.

Yet another object of the present invention is to provide a dispersion compensating optical fiber for which the bending loss is low, so that, in particular, little degradation of transmission loss is entailed, even when it is wound up upon a small sized reel which is received within a housing.

According to the present invention, it is possible to satisfy the above described objects by a dispersion compensating optical fiber which satisfies the conditions (1) through (4) below:

(1) it comprises a core and a cladding layer which is provided at an outer periphery of said core, with said core comprising a central core portion which has a refractive index greater than the refractive index of said cladding, an intermediate core portion which is provided at an outer periphery of said central core portion and which has a refractive index less than the refractive index of said cladding, and a ring core portion which is provided at an outer periphery of said intermediate core portion and which has a refractive index greater than that of said cladding;

(2) with the radii of said central core portion, said intermediate core portion and said ring core portion, and the relative refractive index differences with respect to the refractive index of said cladding layer being termed (a, $\Delta 1$), (b, $\Delta 2$) and (c, $\Delta 3$) respectively, then c is in the range of 6 to 9 $\mu$m, $\Delta 1$ is in the range of 1.2% to 1.7%, $\Delta 2$ is in the range of $-0.25\%$ to $-0.45\%$, $\Delta 3$ is in the range of 0.2% to 1.1%, b/a is in the range of 2.5 to 4.0, and c/b is in the range of 1.1 to 2.0;

(3) the effective area, at a wavelength band which is to be used (operating wavelength band) which is selected within the range of 1.53 $\mu$m to 1.63 $\mu$m, is greater than or equal to 20 $\mu m^2$; the bending loss at said operating wavelength band is less than or equal to 20 dB/m, the chromatic dispersion at said operating wavelength band is in the range of $-70$ to $-100$ ps/nm/km, and it possesses a cutoff wavelength at said operating wavelength band for which single mode propagation is effectively possible;

(4) when chromatic dispersion compensation is performed for a single mode optical fiber which has a zero dispersion wavelength which is shorter than said operating wavelength band by employing a length of this dispersion compensating optical fiber which can compensate the chromatic dispersion to zero, the compensation ratio of the dispersion slope is between 80% and 120%.

The dispersion compensating optical fiber according to the present invention is able to perform compensation for a single mode optical fiber for transmission both for chromatic dispersion and also for dispersion slope over a wide wavelength band, and moreover its value of Aeff is large, and the absolute value of its chromatic dispersion is large. As a result, desirable transmission characteristics are obtained due to the fact that it is possible to suppress the occurrence of nonlinearity effects, and furthermore, since the length thereof which is required is short, the cost is low, and moreover it is possible to incorporate it into a small sized module.

Yet further, it is particularly suitable for employment in a small sized module, since in this manner the length which is required is short and also the bending loss is low.

DESCRIPTION OF THE PREFERRED EMBODIMENTS

Figure 2:
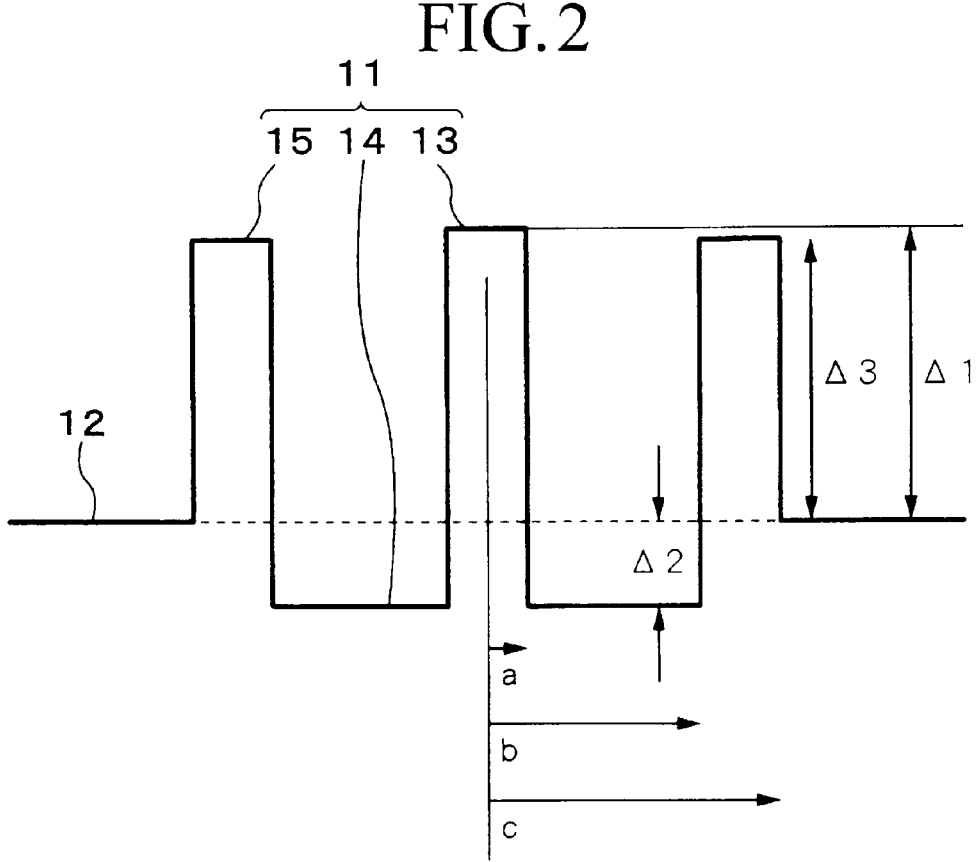
FIG. 2 is an explanatory figure showing a so-called segmented W-shaped refractive index profile, as used for the dispersion compensating optical fiber of the present invention.
Figure 3:
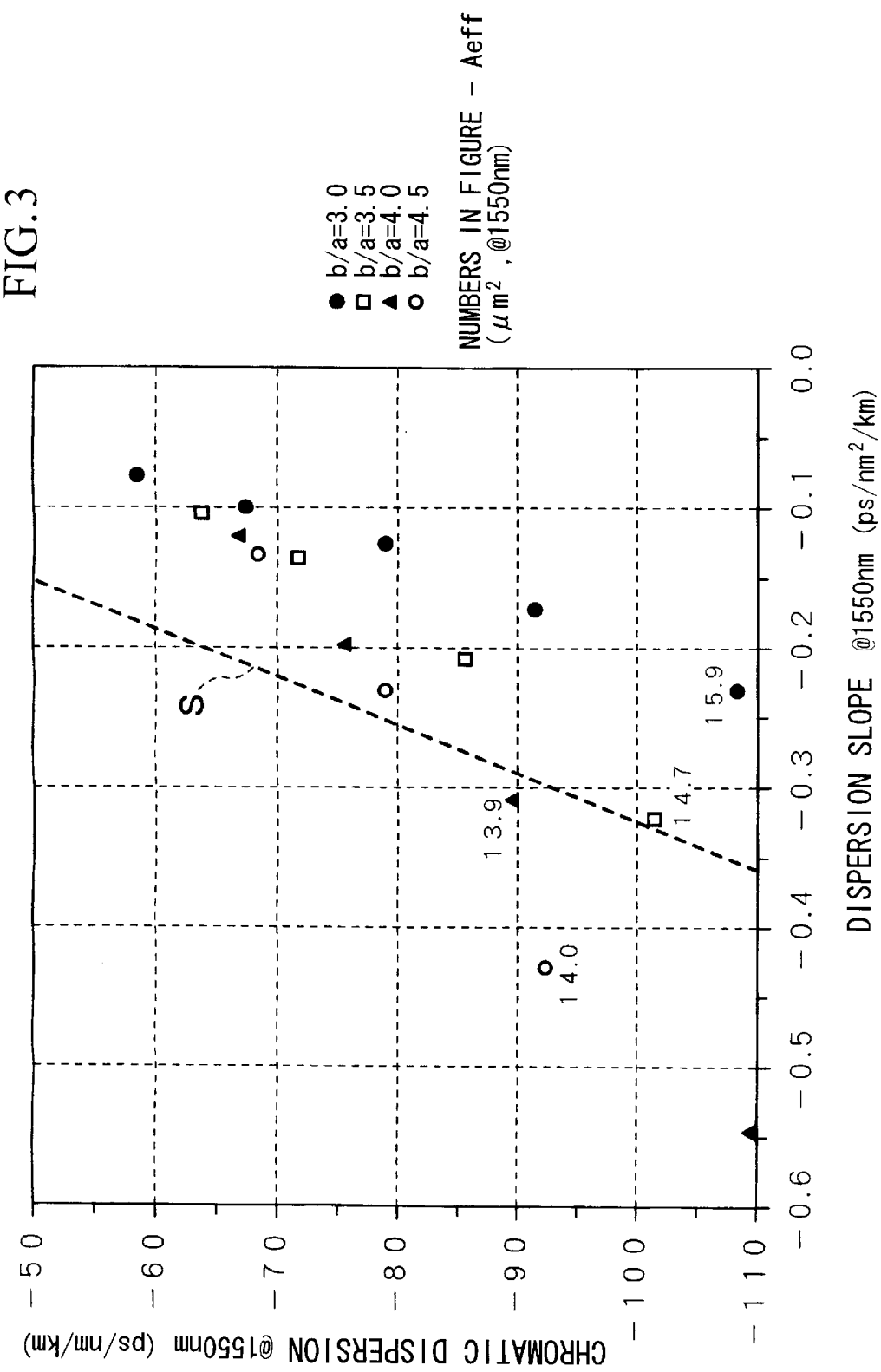
FIG. 3 is a graph showing the relationship between dispersion slope and chromatic dispersion for the refractive index profile shown in FIG. 1, with the operating wavelength being 1.55 $\mu$m, when $\Delta 1$ and $\Delta 2$ are fixed at 1.8% and $-0.4\%$ respectively, and the values of b and b/a are changed.

The dispersion compensating optical fiber of the present invention has a segmented W-shaped refractive index profile, as shown in FIG. 2. This will be explained in the following with reference to FIG. 2. For a segmented W-shaped refractive index distribution shape, the present inventors, have elaborated the present invention and have achieved the feat of producing a dispersion compensating optical fiber which can solve the problems outlined above with respect to the prior art by limiting the respective numerical ranges of a plurality of structural parameters, and moreover by suitably setting the combinations of the plurality of numerical parameters chosen from these numerical ranges. In detail, this dispersion compensating optical fiber comprises a core 11 and a cladding layer 12 provided at an outer periphery of it, with said core 11 comprising a central core portion 13 which has a refractive index which is higher than that of said cladding layer 12, an intermediate core portion 14 which is provided at an outer periphery of said central core portion 13 and which has a refractive index which is lower than that of said cladding layer 12, and a ring core portion 15 which is provided at an outer periphery of said intermediate core portion 14 and which has a refractive index which is higher than that of said cladding layer 12.

For this refractive index profile, for example, the central core portion 13 and the ring core portion 15 may be made from germanium doped silica glass, while the intermediate core portion 14 may be made from fluorine doped silica glass and the cladding layer may be made from pure silica glass or fluorine doped silica glass.

It should be noted that it is desirable for the cladding layer 12 to have a refractive index which is less than or equal to the value of the refractive index of pure silica glass. The reason for this is that, by making the difference between the softening temperatures of the core 11 and the cladding layer 12 small during the manufacture of this dispersion compensating optical fiber as it is being drawn from its fiber parent material, it is possible to reduce the residual stress in the central core portion 13 etc. after the drawing, and thus it is possible to obtain a dispersion compensating optical fiber in which the loss is reduced. With regard to the amount of fluorine to be doped to the cladding layer 12 if the cladding layer 12 is made from fluorine doped silica glass, it is possible to obtain the benefit of sufficiently lowering the softening temperature of the cladding layer 12, if for example this doped amount is adjusted so that the relative refractive index difference of said cladding with respect to that of pure silica glass is between $-0.1\%$ and $-0.4\%$.

In the dispersion compensating optical fiber according to the present invention, it is desirable for the parameter c shown in FIG. 2 to be from 6 to 9 $\mu$m. If the parameter c is less than 6 μm, then the bending loss deteriorates and the transmission characteristics are deteriorated. On the other hand, if the parameter c is greater than 9 μm, then the cutoff wavelength becomes long, and it becomes impossible to ensure single mode propagation in practice.

Furthermore, it is desirable for Δ1 to be between 1.2% and 1.7%. If Δ1 is less than 1.2%, then it becomes impossible to make the absolute value of the chromatic dispersion large, while if Δ1 is greater than 1.7%, then Aeff undesirably becomes small, and the transmission characteristics are deteriorated.

Yet further, it is desirable for Δ2 to be between −0.25% and −0.45%. Outside this range, the dispersion slope compensation ratio undesirably falls outside the range of 80% to 120%. That is, if Δ2 is less than −0.45%, then the dispersion slope compensation ratio undesirably exceeds 120%, while if Δ2 is greater than −0.25%, then the dispersion slope compensation ratio undesirably becomes less than 80%. Moreover, it is desirable for Δ3 to be between 0.2% and 1.1%. If Δ3 is less than 0.2%, then the beneficial effect provided by the ring core portion 15 becomes small, and the value of Aeff may become smaller, so that the bending loss is deteriorated. On the other hand, if Δ3 is greater than 1.1%, then the cutoff wavelength becomes long, and it becomes impossible to ensure single mode propagation in practice.

Further, it is desirable for b/a to be between 2.5 and 4.0. If b/a is less than 2.5, then the dispersion slope compensation ratio undesirably becomes less than or equal to 80%. On the other hand, if b/a is greater than 4.0, then the bending loss is deteriorated.

Yet further, it is desirable for c/b to be between 1.1 and 2.0. If c/b is less than 1.1, then the beneficial effect provided by the ring core portion 15 becomes small, and the value of Aeff may become smaller, so that the bending loss is deteriorated. On the other hand, if c/b is greater than 2.0, then the bending loss is deteriorated.

It is possible appropriately to vary the value of the parameter a according to the specific value which is intended, and it is not to be considered as being particularly limited; however, it may for example be in the range of 1.5 μm to 3.0 μm.

Moreover, although the outer diameter of the cladding layer 12 is not particularly limited, it is usually about 125 μm.

According to the present invention, it is possible to implement the following desirable characteristics with an appropriate combination of a plurality of structural parameters selected from the above described numerical ranges.

It should be understood that it is possible to obtain a dispersion compensating optical fiber which has the following type of characteristics, even if these numerical ranges are not all satisfied. In other words, it is also possible to obtain by trial and error a combination of a suitable plurality of structural parameters which provides the following characteristics.

Accordingly, it is difficult to specify the dispersion compensating optical fiber according to the present invention only by a refractive index profile and numerical ranges of structural parameters, so that, in addition to these elements, it should be specified by the characteristic values as described below.

In the past, as described above, no dispersion compensating optical fiber has been obtained which, in this manner, is excellent in beneficial chromatic dispersion and dispersion slope compensation results, in which Aeff is large in order to suppress nonlinearity effects, with which moreover the absolute value of chromatic dispersion is large, and which can be applied to an optical communication system which utilizes short operating length of the compensating optical fiber, and which also has low bending loss.

The wavelength band which can be utilized (operating wavelength band) with the present invention may be a wavelength band selected from the range 1.53 μm to 1.63 μm. The bandwidth of the operating wavelength band may be selected appropriately according to requirements, and in practice a single wavelength may be acceptable. It should be noted that a comparatively wide wavelength band is selected for wavelength multiplexed transmission or the like, and it is possible to select the wavelength band from 1.53 μm to 1.57 μm (the so called C band) or the band from 1.57 μm to 1.63 μm (the so called L band) or the like. And, with the dispersion compensating optical fiber according to the present invention, in this selected operating wavelength band, Aeff should be 20 μm² or greater, and desirably should be 22 μm² or greater. Although Aeff is not particularly limited to these limit values, fibers in which Aeff is up to about 25 μm² can be manufactured in practice. If Aeff is less than 20 μm², then it is not possible sufficiently to suppress nonlinear effects.

Moreover, Aeff is defined according to the following Equation:

$$Aeff = \frac{2\pi\left\{\int_0^\infty r|E(r)|^2 dr\right\}^2}{\int_0^\infty r|E(r)|^4 dr}$$

r: core radius
E(r): electric field strength at radius r

Furthermore, although it is desirable for the bending loss to be as low as practicable, with the dispersion compensating optical fiber according to the present invention, in said selected operating wavelength band, this bending loss should be less than or equal to 20 dB/m, and preferably should be less than or equal to 10 dB/m. When the bending loss is less than 20 dB/m, it is sufficiently small, and it becomes difficult for degradation of the transmission loss to occur even if the fiber is wound up upon a reel as a small sized module, which is desirable.

Moreover, the bending loss is a value defined under the condition that the bending diameter (2 R) is 20 mm.

Yet further, with the dispersion compensating optical fiber according to the present invention, in said selected operating wavelength band, the chromatic dispersion is from −70 to −100 ps/nm/km, and desirably from −75 to −95 ps/nm/km, so that its absolute value is sufficiently large. Due to this, it is possible to perform compensation for a single mode optical fiber having a zero dispersion wavelength of shorter wavelength than said operating wavelength band, and having a comparatively large positive chromatic dispersion at this operating wavelength band, as represented by a single mode optical fiber for use at 1.3 μm by employing only a short operating length of chromatic compensating fiber.

Furthermore, it is necessary for the dispersion compensating optical fiber according to the present invention to be a single mode optical fiber. That is to say, it is necessary to provide a cutoff wavelength with which single mode propagation can be maintained under actual operational conditions. As the cutoff wavelength, usually a value which is measured by the so called 2-meter method is employed, and in actual operational conditions it is possible to perform single mode propagation even when the cutoff wavelength according to the 2-meter method is longer than the shortest wavelength of the operating wavelength band.

Accordingly, with regard to the cutoff wavelength, an appropriate upper limit value is set according to the waveband which is to be used and according to the length of dispersion compensating optical fiber which is to be used, and the design ensures that in practice the value does not exceed this upper limit value.

Further, with regard to the dispersion slope of the dispersion compensating optical fiber according to the present invention, the compensation ratio of the dispersion slope, when a dispersion compensating optical fiber is utilized of length which can compensate to zero the chromatic dispersion of a single mode optical fiber for transmission which is compensated by this dispersion compensating optical fiber, is 80% to 120%. When this range is departed from, the compensation of the dispersion slope becomes insufficient, and it can happen that difficulties arise in wavelength multiplex transmission and the like.

The compensation ratio of this dispersion slope is obtained as described below.

At the operating wavelength band, the absolute values of the chromatic dispersion and the dispersion slope for a unit length of the single mode optical fiber for transmission will respectively be termed d1 (ps/nm/km) and s1 (ps/nm$^2$/km), while the absolute values of the chromatic dispersion and the dispersion slope for a unit length of the dispersion compensating optical fiber will respectively be termed d2 (ps/nm/km) and s2 (ps/nm$^2$/km).

The chromatic dispersion and the dispersion slope of said single mode optical fiber for transmission are normally positive values. The chromatic dispersion and the dispersion slope of the dispersion compensating optical fiber of the present invention are negative values. First, the length of dispersion compensating optical fiber which can compensate to zero a unit length of the single mode optical fiber for transmission is given by d1/d2.

The dispersion slope of this length of dispersion compensating optical fiber is d1/d2×s2. And the compensation ratio of the dispersion slope of a unit length of the single mode optical fiber for transmission, due to this length of dispersion compensating optical fiber, is (d1/d2×s2)/s1×100.

Since, in this manner, the compensation ratio of the dispersion slope varies according to the chromatic dispersion and the dispersion slope of the single mode optical fiber for transmission which is to be the object of compensation at the operating wavelength band, and according to the chromatic dispersion and the dispersion slope of the dispersion compensating optical fiber itself, therefore it is necessary to design the dispersion compensating optical fiber in accordance with the wavelength band and the single mode optical fiber for transmission which are intended to be used.

Using the dispersion compensating optical fiber according to the present invention, with a suitable combination of structural parameters which are selected from the above described numerical ranges, it is possible sufficiently to perform compensation, in this range of compensation ratio of the dispersion slope, of the dispersion slope of a single mode optical fiber for transmission which has a zero dispersion wavelength shorter than the above described operating wavelength band, as represented by a single mode optical fiber for use at 1.3 μm.

The negative dispersion slope of the dispersion compensating optical fiber can be set to any value in the range from −0.18 to −0.39 ps/nm$^2$/km, and desirably in the range from −0.23 to −0.32 ps/nm$^2$/km.

The dispersion compensating optical fiber according to the present invention may be manufactured using a per se known method such as, for example, the VAD method, the MCVD method, the PCVD method, or the like.

Moreover, although the single mode optical fiber for transmission is not specifically limited (provided that it is one which has a zero dispersion wavelength which is shorter than the operating wavelength band), the following concrete example will be given of one which is suitable for compensation to be performed using the dispersion compensating optical fiber according to the present invention.

For example, it is possible to exhibit a single mode optical fiber for transmission etc. which has a zero dispersion wavelength in the range from 1.27 to 1.35 μm, which in the operating wavelength band has a positive value of chromatic dispersion which in concrete terms is from +14 to +26 ps/nm/km, and which in the operating wavelength band has a positive value of dispersion slope which in concrete terms is from +0.04 to +0.08 ps/nm$^2$/km. The refractive index profile of a single mode optical fiber for transmission which is endowed with these types of characteristics can, for example, be of the matched cladding type, the dual-shaped type or W-shaped type or the like. A fiber of matched cladding type profile is one which is manufactured with two layers: a core in its center which has an approximately constant refractive index, and a cladding layer which is provided at an outer periphery of this core. A fiber of dual-shaped type profile is one in which the core is made up from a central core portion and a staged core portion which is provided at an outer periphery of this central core portion, and in which, in order from its central axis, the indices of refraction of the central core portion, of the staged core portion, and of a cladding layer which is provided at an outer periphery of this staged core portion diminish in stages. A example of W-shaped type profile is mentioned in FIG. 1. It should be understood that a single mode optical fiber for 1.3 μm has a matched cladding type refractive index profile.

And, when this single mode optical fiber for transmission is compensated using a length of the dispersion compensating optical fiber of the invention of the present application which can compensate the chromatic dispersion of said single mode optical fiber for transmission to zero, it is desirable, from the point of view of transmission losses, that the ratio between the length of this dispersion compensating optical fiber and the length of this single mode optical fiber for transmission should be in the range of from 1:3 to 1:7.

Next, it is possible to combine the dispersion compensation optical fiber of the present invention with a single mode optical fiber for transmission, so as to construct a hybrid transmission line. Thus, the dispersion compensation optical fiber of the invention of the present application may be processed into, for example, a small sized dispersion compensating optical fiber module, and may be employed in combination with a transmission line made up from a single mode optical fiber, either as an initial stage or as a final stage.

The lengths etc. of the dispersion compensating optical fiber and the single mode optical fiber which are utilized in this hybrid transmission line are set to appropriate values according to the characteristics of each optical fiber and according to design conditions. In concrete terms, although it is not to be considered as being specifically limited, from the point of view of transmission losses, for example, it is desirable that the ratio between the length of the dispersion compensating optical fiber and the length of the single mode optical fiber should be in the range of from 1:3 to 1:7.

The single mode optical fiber for transmission may be, as described above, represented by a 1.3 μm single mode optical fiber, but it is not to be considered as being specifically limited, provided that it is endowed with a zero dispersion wavelength which is shorter than the operating wavelength band, and with a positive chromatic dispersion and a positive dispersion slope in the operating wavelength band.

Further, since the absolute value of the chromatic dispersion of the dispersion compensation optical fiber according to the present invention is large, in many cases it is possible to perform compensation of a single mode optical fiber for transmission by using a short length of said dispersion compensation optical fiber. Further, the bending loss is also low, so that, even when it is wound up upon a small sized reel, the degradation of transmission loss is low. Accordingly, it is particularly suitable for utilization for a small sized module.

The form and the size etc. of the module can be changed appropriately according to the length of the dispersion compensating optical fiber which is to be used and the like, and a concrete example thereof will be described below, although these features are not to be considered as being particularly limited. In the module of this example, the reel is made up of a cylindrical trunk shaped portion and two circular disk shaped members which are fixed to its upper and lower surfaces in parallel to one another. The outer diameter of said trunk portion upon which the dispersion compensating optical fiber is wound is between 60 and 100 mm, while the length thereof is between 10 and 60 mm. The outer diameters of said disk shaped members is greater than the outer diameter of said trunk portion, and is between 150 and 250 mm. And upon this reel there is wound approximately 1 to 25 km of a resin coated optical fiber of dispersion compensating optical fiber of outer diameter approximately 125 μm made from silica based glass, which is provided with an exterior plastic sheath whose outer diameter is between 200 and 250 μm for protecting its surface. And this reel is received in a rectangular cuboidal housing of dimensions, for example, 230×250×40 mm.

Although this reel is desirably made from a material which has a coefficient of thermal expansion close to that of the material of the dispersion compensating optical fiber, such as a metal composite of silica glass and Invar etc., it is also possible to utilize one made from aluminum or the like.

Furthermore, it is desirable from the point of view of strength that said housing should be made from a metal such as iron, aluminum, or the like.

Two lead out holes of approximate diameter from 2 to 3 mm are provided in this housing for leading out the two end portions of this optical fiber, and this module is assembled to an optical communication system by connecting a single mode optical fiber which is provided externally to this housing to the ends of this optical fiber which are led out from these holes. It should be noted that it would also be possible to provide connection portions to the outside of the housing for connecting the external single mode optical fiber.

Embodiments

In the following the present invention will be described in terms of several embodiments thereof.

Embodiment 1

Using a per se known method such as the VAD method, the MCVD method, the PCVD method or the like, four types of dispersion compensating optical fiber (#A through #D) which were endowed with the refractive index profile shown in FIG. 2 were manufactured.

These dispersion compensating optical fibers were made so that their values of Δ1, Δ2, Δ3, b/a, and c/b shown in FIG. 2 were as given by the following Table 1. The results of measurement of the optical characteristics of these dispersion compensating optical fibers (at the operating wavelength of 1.55 μm) are shown together in Table 1.

TABLE 1

| No. | A | B | C | D |
|---|---|---|---|---|
| Δ1 (%) | 1.40 | 1.36 | 1.30 | 1.30 |
| Δ2 (%) | −0.26 | −0.26 | −0.44 | −0.44 |
| Δ3 (%) | 0.24 | 0.22 | 0.96 | 1.02 |
| b/a | 3.8 | 3.4 | 3.2 | 3.6 |
| c/b | 1.53 | 1.77 | 1.20 | 1.20 |
| CORE RADIUS (μm) | 8.2 | 8.9 | 6.2 | 6.7 |
| WAVELENGTH (μm) | 1.55 | 1.55 | 1.55 | 1.55 |
| Aeff (μm$^2$) | 20.7 | 21.4 | 20.5 | 21.6 |
| TRANSMISSION LOSS (dB/km) | 0.28 | 0.29 | 0.28 | 0.30 |
| CHROMATIC DISPERSION ps/nm/km | −84.2 | −82.0 | −80.2 | −80.0 |
| DISPERSION SLOP ps/nm$^2$/km | −0.26 | −0.24 | −0.24 | −0.24 |
| BENDING LOSS 2R = 20 mm | 18.0 | 7.5 | 3.9 | 4.1 |

As shown in Table 1, these dispersion compensating optical fibers were ones whose parameters fell within the ranges of characteristic values according to the present invention. In particular, the transmission loss of these dispersion compensating optical fibers was within the range of 0.25 to 0.30 dB/km; i.e., they had low loss. Furthermore, Aeff was also greater than or equal to 20 μm$^2$, and therefore these fibers were ones with which it was possible to suppress nonlinear effects.

Accordingly, with an optical communication system which employs these dispersion compensating optical fibers, it will be understood that it becomes possible to increase the power of the optical signal which is inputted, in order to enhance the transmission capacity and to elongate the transmission distance.

Further, with these four types #A through #D of dispersion compensating optical fiber, it was found that, when 100% compensation for chromatic dispersion at a wavelength of utilization of 1.55 μm was performed for a single mode optical fiber for 1.3 μm use which had chromatic dispersion of +17 ps/nm/km and dispersion slope of +0.055 ps/nm$^2$/km, then the compensation ratio of the dispersion slope was, respectively, 95%, 98%, 100%, and 100%. Moreover, the lengths of these dispersion compensating optical fibers which were used at this time, for 80 km of the single mode optical fiber for 1.3 μm use, were respectively 16.15 km, 16.59 km, 16.96 km, and 17.00 km.

Furthermore, as shown in Table 1, the bending loss of these dispersion compensating optical fibers was low.

Small sized modules were made using these dispersion compensating optical fibers, with structures the same as that of the concrete example described above, and, when the transmission losses were measured with the losses due to the external connections to the single mode optical fiber for 1.3 μm use included, increase of the insertion losses (dB) was within the low range of 0.4 to 0.6 dB, and thus in practice these losses were sufficiently suppressed.

COMPARISON EXAMPLES

Figure 1:
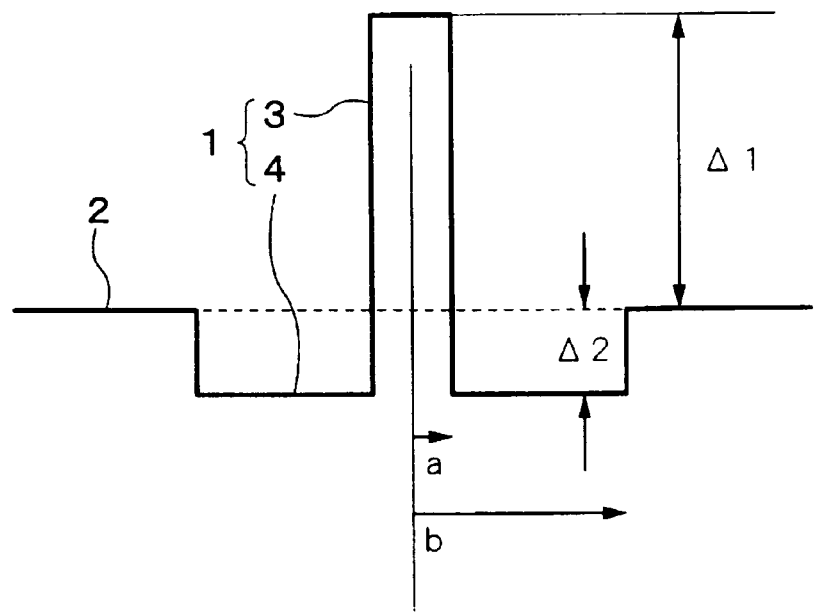
FIG. 1 is an explanatory figure showing a so-called W-shaped refractive index profile.

Using a per se known method such as the VAD method, the MCVD method, the PCVD method or the like, two types of dispersion compensating optical fiber (#E and #F) which were endowed with the refractive index profile shown in FIG. 1 were manufactured. These dispersion compensating optical fibers were made so that their values of Δ1, Δ2, and b/a shown in FIG. 1 were as given by the following Table 2. The results of measurement of the optical characteristics of these dispersion compensating optical fibers (at the operating wavelength of 1.55 μm) are shown together in Table 2.

TABLE 2

| No. | E | F |
|---|---|---|
| Δ1 (%) | 1.80 | 1.60 |
| Δ2 (%) | −0.40 | −0.35 |
| b/a | 4.0 | 3.5 |
| CORE RADIUS (μm) | 4.85 | 4.50 |
| WAVELENGTH (μm) | 1.55 | 1.55 |
| Aeff (μm$^2$) | 13.6 | 16.2 |
| TRANSMISSION LOSS (dB/km) | 0.32 | 0.32 |
| CHROMATIC DISPERSION ps/nm/km | −82.5 | −80.2 |
| DISPERSION SLOP ps/nm$^2$/km | −0.24 | −0.23 |
| BENDING LOSS 2R = 20 mm | 18.3 | 37.6 |

As shown in Table 2, with these dispersion compensating optical fibers, the values of Aeff were all less than 20 μm$^2$, so that these fibers were ones for which the nonlinear effects had not been adequately suppressed.

Accordingly, with an optical communication system which employs these dispersion compensating optical fibers, it will be understood that it is not possible to enhance the transmission capacity or to elongate the transmission distance by increasing the power of the optical signal which is inputted.

Further, with these two types #E and #F of dispersion compensating optical fiber, it was found that, when 100% compensation for chromatic dispersion at a wavelength of utilization of 1.55 μm was performed for a single mode optical fiber for 1.3 μm use which had chromatic dispersion of +17 ps/nm/km and dispersion slope of +0.055 ps/nm$^2$/km, then the compensation ratio of the dispersion slope was, respectively, 97% and 100%. Moreover, the lengths of these dispersion compensating optical fibers which were used at this time, for 80 km of the single mode optical fiber for 1.3 μm use, were respectively 16.48 km and 16.96 km.

Small sized modules were made using these dispersion compensating optical fibers, with structures the same as that of the concrete example described above, and, when the transmission losses were measured with the losses due to the external connections to the single mode optical fiber for 1.3 μm use included, for the case of #E, the increase of the insertion loss was within the low range of 0.4 to 0.6 dB, and thus in practice these losses were sufficiently suppressed. On the other hand in the case of the dispersion compensating optical fiber #F, the increase of the transmission loss was in the high range of 1.0 to 1.5 dB due to the occurrence of bending loss degradation, and thus it will be understood that these fibers are unsuitable for this size of module.

Embodiment 2

Using a per se known method such as the VAD method, the MCVD method, the PCVD method or the like, a dispersion compensating optical fiber #G which was endowed with the refractive index profile shown in FIG. 2 was manufactured.

This dispersion compensating optical fiber was made so that its values of Δ1, Δ2, Δ3, b/a, and c/b shown in FIG. 2 were as given by the following Table 3. The results of measurement of the optical characteristics of this dispersion compensating optical fiber (at the operating wavelength of 1.59 μm) are shown together in Table 3.

TABLE 3

| No. | G |
|---|---|
| Δ1 (%) | 1.40 |
| Δ2 (%) | −0.26 |
| Δ3 (%) | 0.3 |
| b/a | 3.8 |
| c/d | 1.53 |
| CORE RADIUS (μm) | 8.5 |
| WAVELENGTH (μm) | 1.59 |
| Aeff (μm$^2$) | 22.8 |
| TRANSMISSION LOSS (dB/km) | 0.29 |
| CHROMATIC DISPERSION ps/nm/km | −88.7 |
| DISPERSION SLOP ps/nm$^2$/km | −0.28 |
| BENDING LOSS 2R = 20 mm | 16.9 |

As shown in Table 3, this dispersion compensating optical fiber was one whose parameters fell within the ranges of characteristic values according to the present invention. In particular, the transmission loss of this dispersion compensating optical fiber was 0.29 dB/km; i.e., it had low loss. Furthermore, Aeff was also greater than or equal to 20 μm$^2$, and therefore this fiber was one with which it was possible to suppress nonlinear effects.

Accordingly, with an optical communication system which employs this dispersion compensating optical fiber, it will be understood that it becomes possible to increase the power of the optical signal which is inputted, in order to enhance the transmission capacity and to elongate the transmission distance.

Further, with this dispersion compensating optical fiber, it was found that, when 100% compensation for chromatic dispersion at a wavelength of utilization of 1.59 μm was performed for a single mode optical fiber for 1.3 μm use which had chromatic dispersion of +19 ps/nm/km and dispersion slope of +0.053 ps/nm$^2$/km, then the compensation ratio of the dispersion slope was 113%. Moreover, the length of this dispersion compensating optical fiber which was used at this time, for 80 km of the single mode optical fiber for 1.3 μm use, was 17.14 km.

Furthermore, as shown in Table 3, the bending loss of this dispersion compensating optical fiber was low.

A small sized module was made using this dispersion compensating optical fiber, with structure the same as that of the concrete example described above, and, when the transmission loss was measured with the losses due to the external connections to the single mode optical fiber for 1.3 μm use included, increase of the insertion loss was within the small range of 0.4 to 0.6 dB, and thus in practice this loss was sufficiently suppressed.

What is claimed is:

1. A dispersion compensating optical fiber which satisfies the conditions (1) through (4) below:
   (1) it comprises a core and a cladding layer which is provided at an outer periphery of said core, with said core comprising a central core portion which has a refractive index greater than the refractive index of said cladding, an intermediate core portion which is provided at an outer periphery of said central core portion and which has a refractive index less than the refractive index of said cladding, and a ring core portion which is provided at an outer periphery of said intermediate core portion and which has a refractive index greater than that of said cladding;
   (2) with radii and relative refractive index differences with respect to a refractive index of said cladding layer of said central core portion, said intermediate core portion and said ring core portion, being termed (a, Δ1), (b, Δ2) and (c, Δ3) respectively, then c is in the range of 6 to 9 μm, Δ1 is in the range of 1.2% to 1.7%, Δ2 is in the range of −0.25% to −0.45%, Δ3 is in the range of 0.2% to 1.1%, b/a is in the range of 2.5 to 4.0, and c/b is in the range of 1.1 to 2.0;

(3) the effective area, at a operating wavelength band which is selected within the range of 1.53 µm to 1.63 µm, is greater than or equal to 20 µm$^2$; the bending loss at said operating wavelength band is less than or equal to 20 dB/m, the chromatic dispersion at said operating wavelength band is in the range of −70 to −100 ps/nm/km, and it possesses a cutoff wavelength at said operating wavelength band for which single mode propagation is effectively possible;

(4) when chromatic dispersion compensation is performed for a single mode optical fiber which has a zero dispersion wavelength which is shorter than said operating wavelength band by employing a length of this dispersion compensating optical fiber which can compensate the chromatic dispersion to zero, the compensation ratio of the dispersion slope is between 80% and 120%.

2. A dispersion compensating optical fiber according to claim 1, wherein said cladding layer has a refractive index which is less than or equal to the refractive index of pure silica glass.

3. A dispersion compensating optical fiber according to claim 2, wherein said cladding layer is made from fluorine doped silica glass, and the amount of fluorine which is doped is adjusted so that the relative refractive index difference of said cladding with respect to that of pure silica glass is between −0.1% and −0.4%.

4. A dispersion compensating optical fiber according to claim 1, wherein said value a is between 1.5 and 3.0 µm.

5. A dispersion compensating optical fiber according to claim 1, wherein the effective area, at said operating wavelength band, is greater than or equal to 22 µm$^2$.

6. A dispersion compensating optical fiber according to claim 1, wherein the bending loss, at said operating wavelength band, is less than or equal to 10 dB/m.

7. A dispersion compensating optical fiber according to claim 1, wherein the chromatic dispersion, at said operating wavelength band, is between −75 and −95 ps/nm/km.

8. A dispersion compensating optical fiber according to claim 1, wherein the value of the dispersion slope, at said operating wavelength band, is negative.

9. A dispersion compensating optical fiber according to claim 1, wherein the dispersion slope, at said operating wavelength band, is between −0.18 and −0.39 ps/nm$^2$/km.

10. A dispersion compensating optical fiber according to claim 1, wherein the dispersion slope, at said operating wavelength band, is between −0.23 and −0.32 ps/nm$^2$/km.

11. A dispersion compensating optical fiber according to claim 1, wherein, when chromatic dispersion compensation is performed for a single mode optical fiber which has a zero dispersion wavelength which is shorter than said operating wavelength band by employing a length of this dispersion compensating optical fiber which can compensate the chromatic dispersion to zero, the ratio of a length of said dispersion compensating optical fiber to a length of said single mode optical fiber is between 1:3 and 1:7.

12. A dispersion compensating optical fiber according to claim 1, wherein, at said wavelength which is to be used, said single mode optical fiber has a positive value of chromatic dispersion and a positive value of dispersion slope.

13. A dispersion compensating optical fiber according to claim 1, wherein said single mode optical fiber is a single mode optical fiber for use at 1.3 µm.

14. A dispersion compensating optical fiber module which comprises a dispersion compensating optical fiber according to claim 1.

15. A dispersion compensating optical fiber module according to claim 14, wherein said dispersion compensating optical fiber is wound onto a reel which is received in a housing.

16. A hybrid transmission line, comprising a combination of a dispersion compensating optical fiber according to claim 1, and a single mode optical fiber which is compensated by said dispersion compensating optical fiber for chromatic dispersion and dispersion slope.

17. A hybrid transmission line according to claim 16, wherein the ratio of a length of said dispersion compensating optical fiber to a length of said single mode optical fiber is between 1:3 and 1:7.

18. A hybrid transmission line according to claim 16, wherein, at said wavelength which is to be used, said single mode optical fiber has a positive value of chromatic dispersion and a positive value of dispersion slope.

19. A hybrid transmission line according to claim 16, wherein said single mode optical fiber is a single mode optical fiber for use at 1.3 µm.

* * * * *